United States Patent
Martins, Samuel J.

[11] 3,905,455
[45] Sept. 16, 1975

[54] DISC BRAKE CALIPER AND TORQUE ARM INTERFACE ASSEMBLY AND RETENTION

[75] Inventor: Samuel J. Martins, Reseda, Calif.

[73] Assignee: Airheart Products, Inc., Chatsworth, Calif.

[22] Filed: June 24, 1974

[21] Appl. No.: 482,314

[52] U.S. Cl. ............................................... 188/73.3
[51] Int. Cl.² ............................................ F16D 55/224
[58] Field of Search ............... 188/71.1, 72.4, 73.3

[56] References Cited
UNITED STATES PATENTS
3,625,314  12/1971  Rinker ................... 188/73.3 X
3,782,509  1/1974  Cook et al. ................. 188/73.3

*Primary Examiner*—George E. A. Halvosa
*Attorney, Agent, or Firm*—William W. Haefliger

[57] ABSTRACT

A rotary disc brake assembly includes a caliper coupled to a torque arm for initial adjustment displacement generally parallel to the disc, and subsequent shifting displacement axially of the disc and torque arm during braking.

8 Claims, 7 Drawing Figures

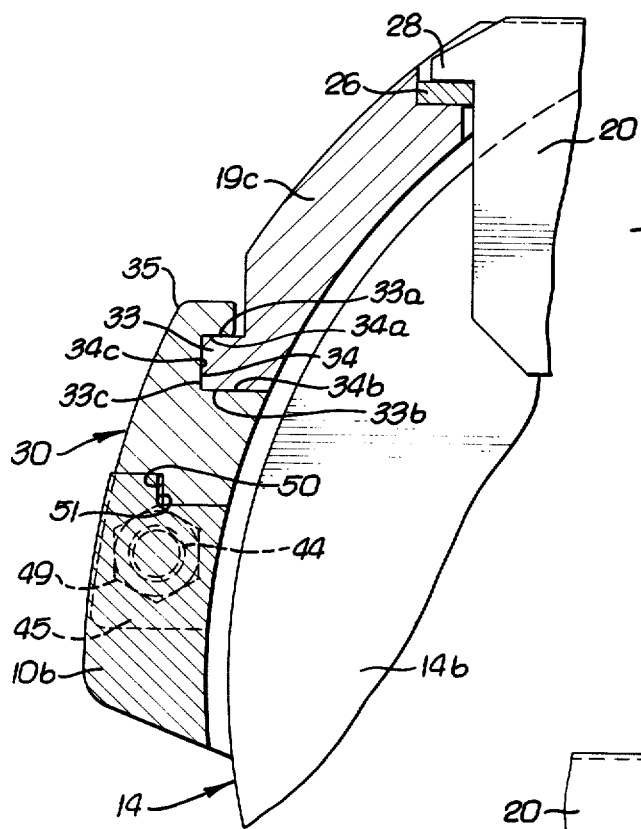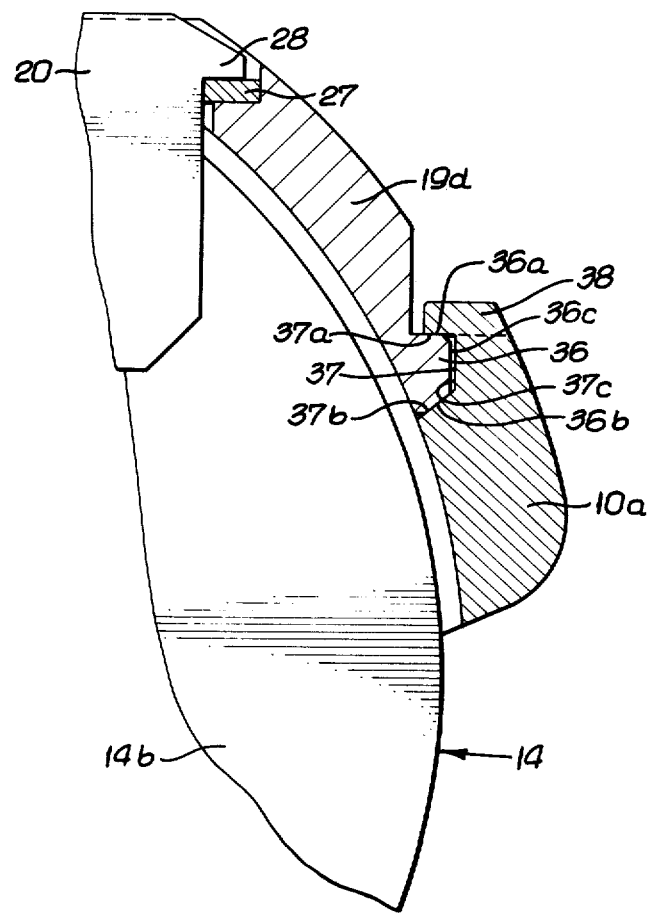

DISC BRAKE CALIPER AND TORQUE ARM INTERFACE ASSEMBLY AND RETENTION

BACKGROUND OF THE INVENTION

This invention relates generally to disc brakes, and more particularly concerns the elimination of problems arising from conventional carriage of calipers on torque arms.

In conventional disc brake design, the caliper and torque arm are intercoupled by axially extending pins or shafts relative to which the caliper is movable axially, or the shaft or shafts are carried by the caliper to move axially relative to the torque arm. Such axial freedom of movement of the caliper, as facilitated by the shafts, is critically necessary during braking; however, it is found that blockage can and does at times occur due to wear or load induced axial misalignment of the relatively moving parts. Also, there was no sufficiently satisfactory way to adjust for wear of the parts so as to obviate the risk of relative movement blockage during braking.

SUMMARY OF THE INVENTION

It is a major object of the invention to provide a solution or solutions to the above as well as other associated problems. Basically, the invention is embodied in a disc brake assembly that comprises:

a. a torque arm,
b. a caliper adapted to straddle the disc during disc rotation relative to the caliper, and
c. a braking element carried by the caliper to face one side of the disc, and
d. means coupling the caliper to the torque arm for initial adjustment displacement in a lateral direction generally parallel to said disc, and for subsequent shifting displacement in a generally longitudinal axial direction relative to the torque arm and disc during braking.

As will appear, the aforesaid means may comprise an adjuster adjustably attached to one of the torque arm and caliper for selective displacement relative thereto, the adjuster having a first coupling with the other of the caliper and torque arm to shift the caliper generally laterally in response to such relative displacement of the adjuster; and, a second coupling between the torque arm and caliper at a location spaced from the adjuster, the second coupling having a closeness of fit which increases or decreases in correspondence to the lateral direction of relative displacement of the adjuster. As a result, undesirable caliper looseness relative to the torque arm may be overcome, in a plane parallel to the disc plane. In addition, the couplings may define interfitting tongue and groove elements providing longitudinally extending guideways to prevent relative movement hang-ups or blockage, and the couplings may be located at opposite end portions of the caliper to facilitate ease of assembly, adjustment and repair.

Additional objects and advantages include the provision of the second coupling with tongue and groove elements having wedge interfit whereby shifting of the caliper in one lateral direction relative to the torque arm adjusts the tightness or looseness of the coupling interfit, in a plane parallel to the disc plane; and the provision of longitudinally extending safety stop shoulders on the adjuster and torque arm that are interengageable to limit lateral relative displacement of the caliper and torque so as to prevent undesired or inadvertent uncoupling of the second coupling.

These and other objects and advantages of the invention, as well as details of an illustrative embodiment, will be more fully understood from the following description and drawings, in which:

DRAWING DESCRIPTION

FIG. 1 is a side elevation showing disc brake structure incorporating one preferred form of the invention;
FIG. 2 is a left end elevation of the FIG. 1 structure;
FIG. 3 is an enlarged fragmentary section on lines 3—3 of FIG. 2;
FIG. 4 is a right end elevation of FIG. 1 structure;
FIG. 5 is an enlarged fragmentary section on lines 5—5 of FIG. 4; and
FIG. 6 is a section on lines 6—6 of FIG. 1; and
FIG. 7 is a perspective showing of an adjuster.

DETAILED DESCRIPTION

Figure 1:
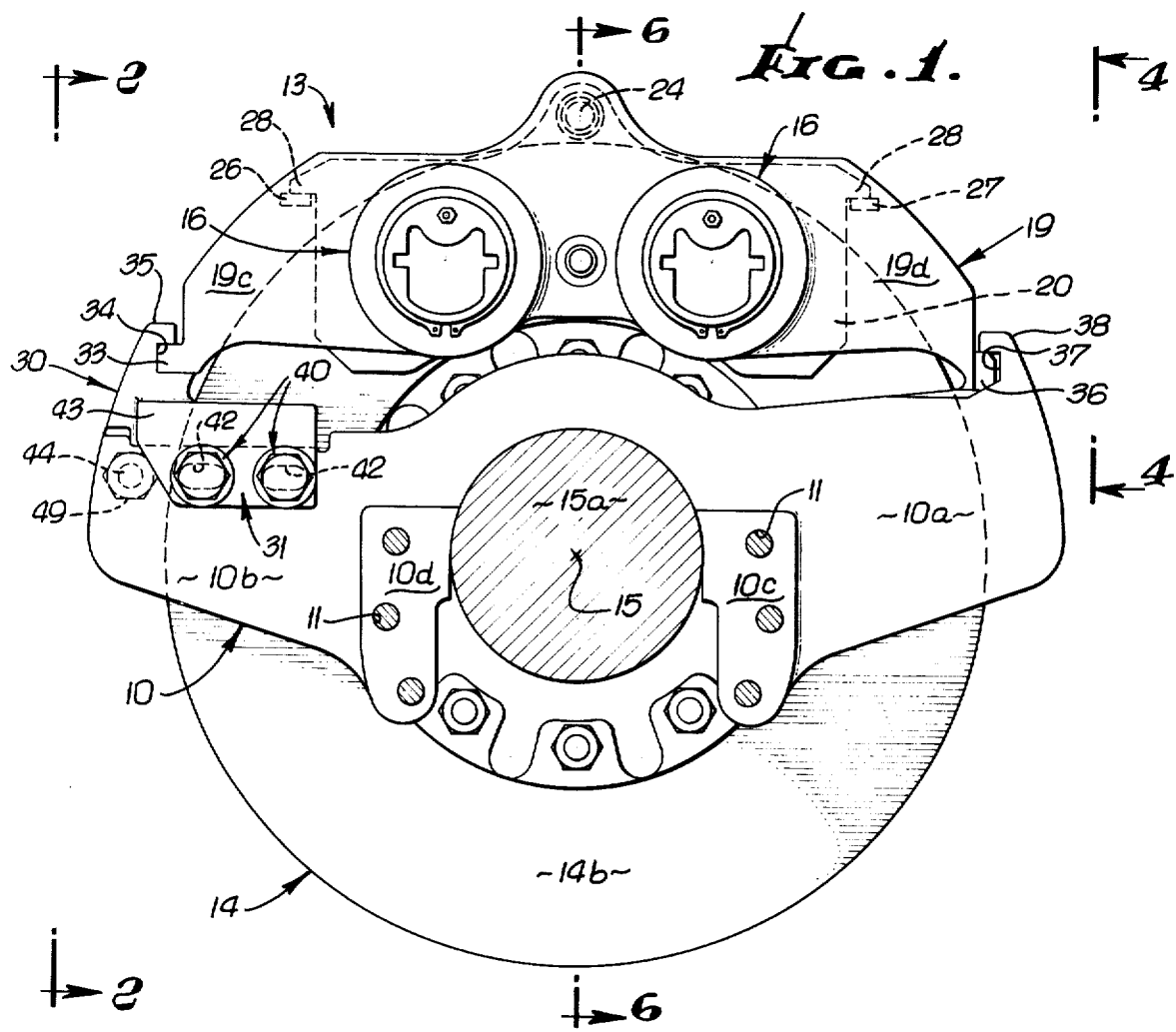
Figure 4:
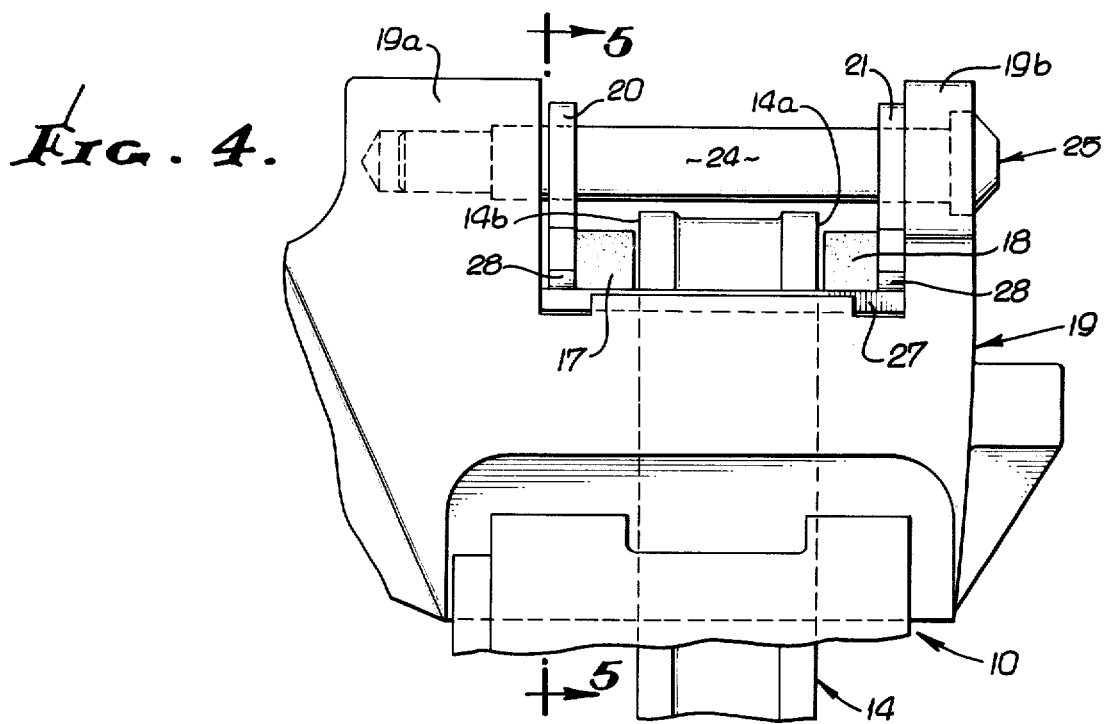
Figure 2:
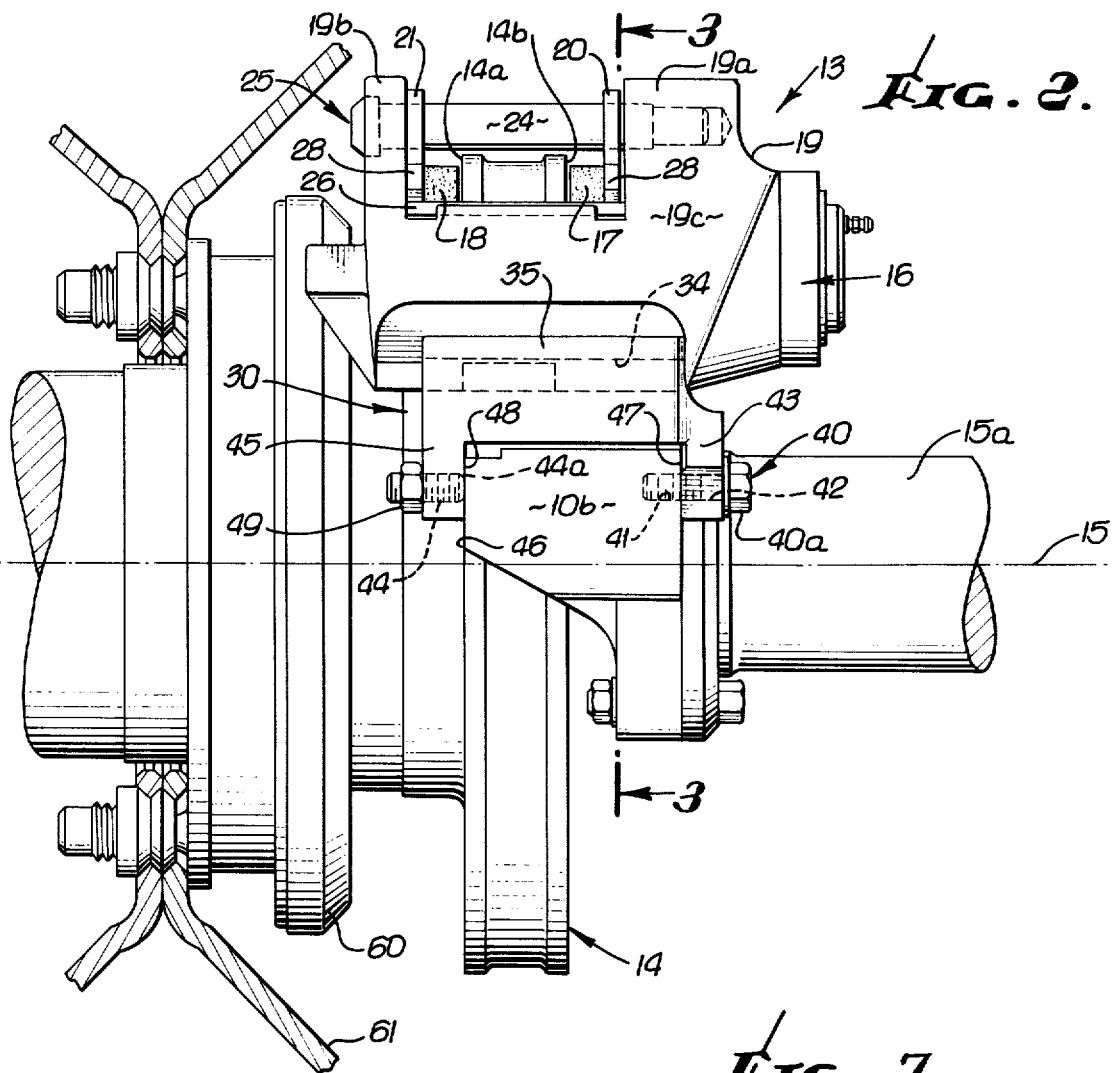
Figure 7:
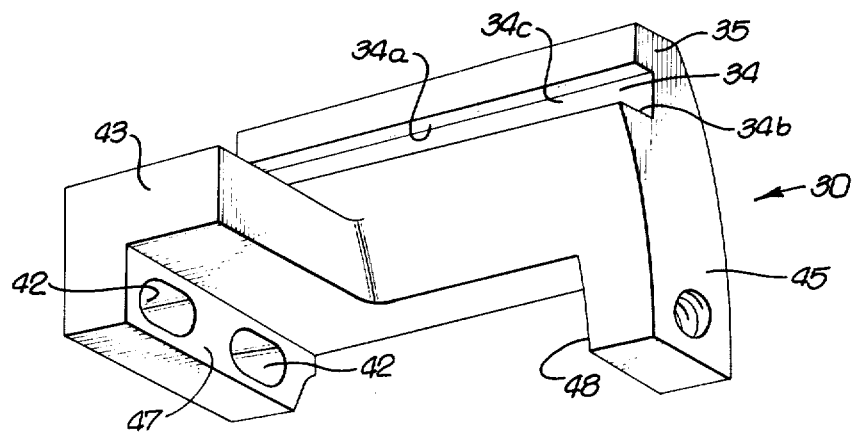

In the drawings, a torque arm 10 includes extents 10a and 10b projecting oppositely from portions 10c and 10d adapted to be bolted, via drilled openings 11, to axle flange 12. The torque arm extents 10a and 10b support a caliper assembly 13 straddling the disc 14, which has opposite sides or faces 14a and 14b. Disc 14 rotates about axis 15 relative to the caliper assembly, the latter carrying actuators 16 for urging brake pads 17 against one side 14b of the disc. The caliper brake pads 18 are carried at the opposite side of the disc to engage and brake that side 14a in response to operation of the actuators, and reaction shifting of the caliper body 19 parallel to axis 15 of axle 15a.

The pads 17 and 18 are respectively carried by plates 20 and 21 containing bores 22 and 23 to loosely pass the shaft 24 of a bolt 25 which thereby suspends the plates and pads for axial shifting in response to braking and caliper reaction shifting. Bolt 25 is carried by caliper body flanges 19a and 19b. Laterally spaced, axially elongated wear plates 26 and 27 are carried by the caliper to seat laterally spaced ears 28 on the plates 20 and 21.

In accordance with the invention, means is provided to couple the caliper to the torque arm for initial adjustment displacement in a lateral direction generally parallel to the disc, and for subsequent shifting displacement, in reaction to braking, in a generally longitudinal axial direction relative to the torque arm and disc. Such means may advantageously include an adjuster attached to one of the torque arm and caliper elements for selective displacement relative thereto, the adjuster having a first coupling with the other of the torque arm and caliper elements to adjustably bodily shift the caliper generally laterally in response to such selective relative displacement of the adjuster. In the example, the adjuster 30 is adjustably attached at 31 to the torque arm extent 10b, and the first coupling is provided between the adjuster and caliper body extent 19c, to define first tongue and groove elements forming longitudinally extending guideways to guide the caliper in its reaction shifting, axially. Such elements may comprise, for example, the tongue 33 integral with the caliper body extent 19c, and the groove 34 defined by the hook-shaped part or extension 35 on the adjuster. Upper and lower guide surfaces 33a and 33b on the tongue loosely or slidably interfit between upper and lower groove surfaces 34a and 34b, and lateral surface 34c of the groove guides and restrains tongue lateral surface 33c.

The above referenced means may also include a second coupling between the torque arm and caliper at a second location spaced from the adjuster, the second coupling having a closeness of interfit which increases or decreases in correspondence to the lateral direction of bodily displacement of the caliper relative to the torque arm. In the example, the second coupling is provided between the caliper body extent 19d and the torque arm extent 10a, to define second tongue and groove elements providing longitudinally extending guideways to guide the caliper in its reaction shifting, longitudinally. Such elements may comprise, for example, the tongue 36 integral with the caliper body extent 19d, and the groove 37 defined by the hook-shaped part or extension 38 on the torque arm. Upper and lower guide surfaces 36a and 36b on the tongue loosely or slidably interfit between upper and lower groove surfaces 37a and 37b, and lateral surface 36c on the tongue is spaced from lateral groove surface 37c. In this regard, the surfaces 36b and 37b preferably have wedge interfit in a lateral direction whereby the looseness of the tongue and groove interfit decreases as the caliper is urged rightwardly in FIG. 1 toward the second coupling in response to relative rightward displacement of the adjuster 30. Accordingly, optimum interfit may be readily achieved by means of the adjuster.

Such displacement is enabled through the provision of laterally spaced bolts 40 carried by the torque arm (as by reception into threaded openings 41 in torque arm extent 10b). The bolts or fasteners extend through laterally elongated slots 42 in the adjuster flange 43, the vertical widths of the slots being only slightly greater than the bolt shank diameters. A set screw 44 is carried by the adjuster flange 45 at the opposite side of the torque arm extent 10b, and when tightened the sharply angled annular 44a tip of the set screw penetrates slightly into the torque arm face 46 to block lateral shifting of the adjuster. Such shifting is possible only when either or both the set screw and bolts 40 are sufficiently loosened. Note that the adjuster flanges 43 and 45 straddle the torque arm extent 10b and have close sliding contact therewith at parallel interfaces 47 and 48. A nut 49 on the set screw is turnable to loosen or tighten same, and bolt heads 40a are turnable for the same purpose. When the adjuster is tightly connected to the torque arm, it acts as a lateral retainer for the caliper.

An additional feature of the invention concerns the provision of longitudinally extending laterally facing stop shoulders 50 and 51 on the adjuster and torque arm, respectively. Such shoulders are interengageable, in the event of inadvertent leftward slippage of the adjuster in FIG. 3, to limit or block lateral relative displacement of the adjuster and caliper to prevent undesired and unsafe uncoupling of the second coupling, i.e. tongue and groove elements 36 and 37 in FIG. 5, should the adjuster loosen and slip relative to the torque arm.

Figure 6:
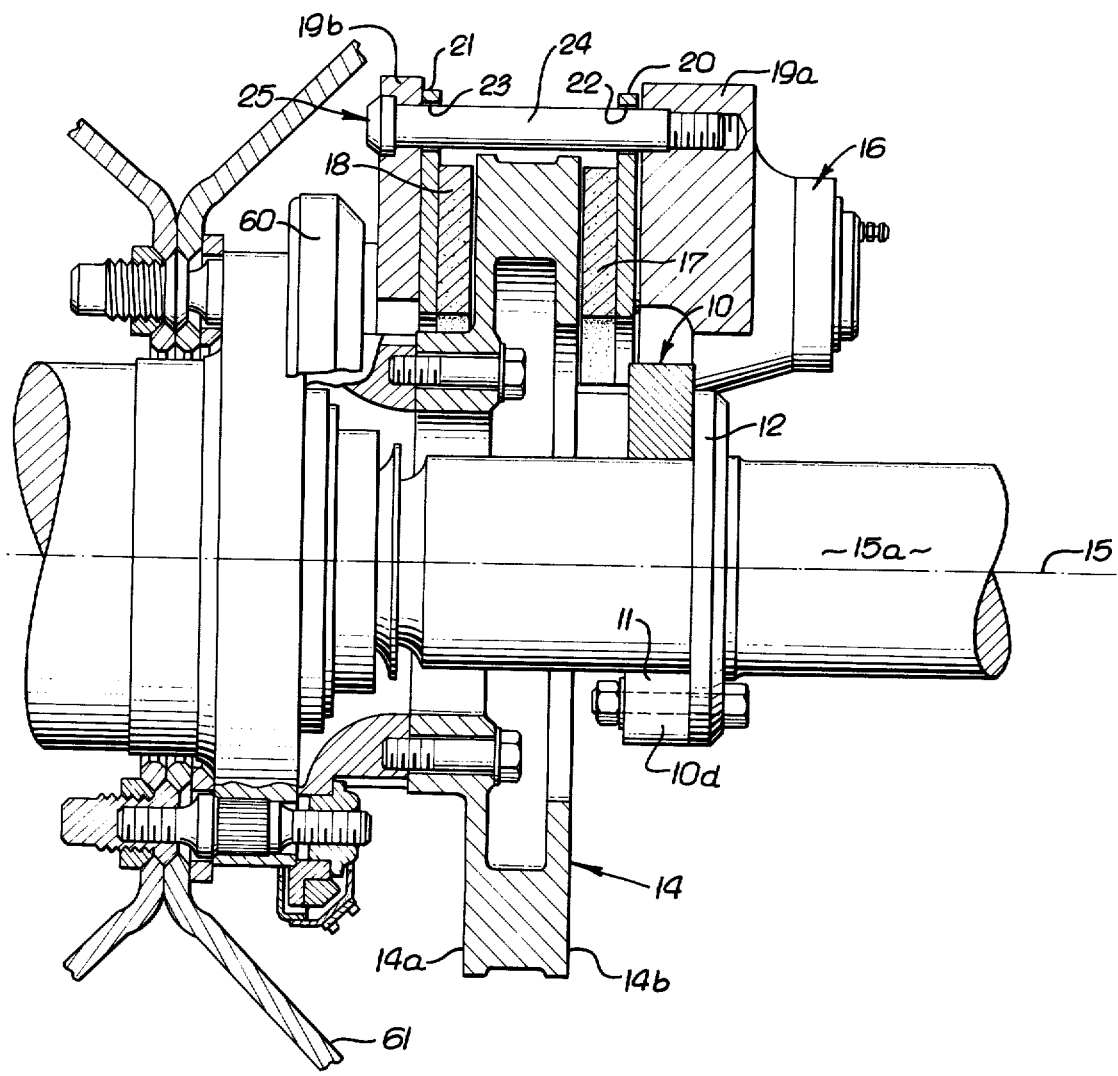

Note in FIG. 6 that the disc 14 may be integral with structure 60 to which a vehicle wheel 61 is suitably attached.

I claim:

1. In an assembly for braking a rotary disc having an axis and defining a plane normal to said axis,
  a. a torque arm,
  b. a caliper adapted to straddle the disc during disc rotation relative to the caliper, and
  c. a braking element carried by the caliper to face one side of the disc, and
  d. means coupling the caliper to the torque arm for initial adjustment displacement in a lateral direction generally parallel to said disc, and for subsequent shifting displacement in a generally longitudinal axial direction relative to the torque arm and disc during braking, said means including an adjuster adjustably attached to one of the torque arm and caliper for selective displacement relative thereto, the adjuster having a first coupling with the other of the caliper and torque arm to shift the caliper generally laterally in response to said relative displacement of the adjuster, the first coupling defining first tongue and groove elements providing first longitudinally extending guideways, said means also including a second coupling between the torque arm and caliper at a location laterally spaced from said adjuster, said second coupling defining second tongue and groove elements having wedge interfit in a lateral direction and which increases or decreases in correspondence to the lateral direction of said relative displacement of the adjuster, said second tongue and groove elements providing second longitudinally extending guideways the adjuster having a flange at a longitudinally facing side of said one of the torque arm and caliper, and there being longitudinally extending fasteners extending through laterally elongated slots in said flange to adjustably attach the adjuster to said one of the torque arm and caliper.

2. The assembly of claim 1 wherein the adjuster has adjustable attachment to the torque arm, and said first coupling is between the adjuster and caliper.

3. The assembly of claim 2 wherein said adjuster and torque arm have longitudinally extending, laterally facing stop shoulders that are interengageable to limit lateral relative displacement of the caliper and torque arm to prevent uncoupling of said second coupling.

4. The assembly of claim 2 wherein said adjuster straddles the torque arm, longitudinally.

5. The assembly of claim 4 wherein said adjustable attachment includes a set screw attaching the adjuster to the torque arm for blocking lateral shifting of the adjuster when the set screw is tightened.

6. The assembly of claim 1 wherein said first and second couplings are located at generally laterally opposite end portions of the caliper.

7. The assembly of claim 6 wherein said wedge interfit decreases as the caliper is urged relatively toward the second coupling in response to relative displacement of the adjuster.

8. In an assembly for braking a rotary disc having an axis and defining a plane normal to said axis,
  a. a torque arm,
  b. a caliper adapted to straddle the disc during disc rotation relative to the caliper, and
  c. a braking element carred by the caliper to face one side of the disc, and
  d. means coupling the caliper to the torque arm for initial adjustment displacement in a lateral direction generally parallel to said disc, and for subsequent shifting displacement in a generally longitudinal axial direction relative to the torque arm and disc during braking, said means including an adjuster adjustably attached to one of the torque arm and caliper for selective displacement relative thereto, the adjuster having a first coupling with the other of the caliper and torque arm to shift the caliper generally laterally in response to said relative displacement of the adjuster, the first coupling defining first tongue and groove elements providing first longitudinally extending guideways, said means also including a second coupling between the torque arm and caliper at a location laterally spaced from said adjuster, said second coupling defining second tongue and groove elements having wedge interfit in a lateral direction and which increases or decreases in correspondence to the lateral direction of said relative displacement of the adjuster, said second tongue and groove elements providing second longitudinally extending guideways, the adjuster having a flange at a longitudinally facing side of said one of the torque arm and caliper, and there being longitudinally extending fastener means extending through laterally elongated slot means in said flange to adjustably attach the adjuster to said one of the torque arm and caliper.

* * * * *